(12) United States Patent
Sugimoto

(10) Patent No.: US 7,497,902 B2
(45) Date of Patent: Mar. 3, 2009

(54) WATER BASED INK COMPOSITION FOR ROLLERBALL PEN

(75) Inventor: Yasuyuki Sugimoto, Susono (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 0 days.

(21) Appl. No.: 11/713,054

(22) Filed: Mar. 2, 2007

(65) Prior Publication Data
US 2007/0204761 A1    Sep. 6, 2007

(30) Foreign Application Priority Data
Mar. 3, 2006    (JP) ............................. 2006-058043

(51) Int. Cl.
*C09D 11/00*    (2006.01)

(52) U.S. Cl. .............. 106/31.58; 106/31.59; 106/31.86; 106/31.89

(58) Field of Classification Search .............. 106/31.58, 106/31.59, 31.86, 31.89
See application file for complete search history.

(56) References Cited

U.S. PATENT DOCUMENTS

| 5,609,432 A | * | 3/1997 | Yamamoto et al. | ........... 401/209 |
| 5,741,354 A | * | 4/1998 | Kawasumi et al. | ........ 106/31.89 |
| 2006/0173094 A1 | * | 8/2006 | Ikoma et al. | ................ 523/161 |

FOREIGN PATENT DOCUMENTS

| JP | A 57-005773 | 1/1982 |
| JP | A 63-280783 | 11/1988 |
| JP | B2 01-013508 | 3/1989 |
| JP | A 03-275778 | 12/1991 |
| JP | A 04-214782 | 8/1992 |
| JP | A 05-086319 | 4/1993 |
| JP | B2 05-054876 | 8/1993 |
| JP | B2 07-113101 | 12/1995 |
| JP | A 2000-71676 | 3/2000 |
| JP | A 2002-080770 | 3/2002 |
| JP | A 2004-058615 | 2/2004 |
| JP | A 2005-132885 | 5/2005 |

* cited by examiner

*Primary Examiner*—Helene Klemanski
(74) *Attorney, Agent, or Firm*—Oliff & Berridge, PLC

(57) ABSTRACT

Disclosed is a water based ink composition for a rollerball pen that includes at a least colorant, a water-soluble organic solvent, water, a shear thinning viscosity property-providing agent, a lubricant, and a bubble suppressant. The ink composition includes a phosphate-ester based surfactant having a structure of general formula 1 as the lubricant, and an erythorbic acid or a derivative thereof as the bubble suppressant General formula 1

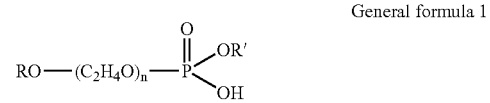

(n represents an integer of 1 or more, R represents an alkyl group having carbon numbers of 12 to 15, and R' represents H or R—$(C_2H_4O)_n$—).

2 Claims, No Drawings

WATER BASED INK COMPOSITION FOR ROLLERBALL PEN

BACKGROUND OF THE INVENTION

1. Field of the Invention

The present invention relates to a water based ink composition for a rollerball pen. In particular, the present invention relates to an ink composition having shear thinning viscosity, which is used for a water based gel ink rollerball pen. The water based gel ink rollerball pen is structured so that one end is packed with a rollerball pen tip and the other end is packed with an ink backflow preventing body that follows ink in accordance with ink consumption, wherein ink is directly filled into an ink tank.

2. Description of the Related Art

Conventionally, among water based inks, as for an ink that has shear thinning viscosity, a technique relating to a water based ink composition for a rollerball pen, in which the ink composition includes a shear thinning viscosity-providing agent such as macromolecular polysaccharide, has been disclosed. (For example, refer to Japanese Patent Application Publication (Laid Open) No. Tokukaihei 4-214782, hereinafter referred to as patent document 1.)

This type of water based ink has shear thinning viscosity. When the ink is stably placed without being applied with a shearing force, this type of water based ink has high viscosity and is stably stored in an ink tank. However, when a rollerball pen including such ink is used for writing, a shearing force caused by a ball rotating with high speed makes the ink in the vicinity of the ball to have lower viscosity. As a result, the ink is discharged from a gap between the ball and a ball storage section, to be transferred onto a paper surface. The ink transferred to the paper surface is released from the shearing force and thus has high viscosity again, thereby preventing line-blurs of handwriting, which has been a disadvantage of a conventional water based ink composition.

Furthermore, the above-described shear thinning viscosity can prevent ink leakage, and no flow rate adjustment member for adjusting ink flow rate (e.g., pen core) is required. Therefore, there is an advantage that a writing instrument having a simple structure can be obtained.

The writing instrument using the above-described water based ink having shear thinning viscosity has a simple structure. In contrast to a conventional writing instrument using the flow rate adjustment member, the writing instrument using the above-described water based ink having shear thinning viscosity prevents air from entering the structure in accordance with ink consumption. Thus, an advantage is obtained in that a change in internal pressure is small and excessive ink discharge is prevented. However, this writing instrument requires a special care for preparation and filling of the ink. The writing instrument using water based ink having the above-described shear thinning viscosity is structured so that rear end face of the ink is packed with grease-like ink backflow preventing body that prevents solvent in the ink from evaporating, or prevents ink back flow when a writing tip end faces upward (upright status). This ink backflow preventing body follows the ink in accordance with ink consumption and is hereinafter referred to as liquid plug. This allows the ink to exist in an airtight space blocked from outside air. When gaseous matter is mixed into the ink, the gaseous matter coagulates with time and generates bubbles. Such bubbles cause an adverse influence on ink discharge during writing, generates bubbles at a writing tip end, and cause a risk of writing defect when the bubbles move.

In order to solve the above problems, a defoaming processing by a centrifugal separation has generally been performed when a rollerball pen is assembled. However, in a case where only this processing is conducted, the deforming is insufficient and thus gas may be left in the ink. When insoluble colorant such as pigment, metal powders, and titanic oxide is used, and the ink is subjected to a centrifugal defoaming processing with a strong G, a defect is arises in which the colorant exists unevenly in an ink storage container.

As for improvement of the above processing, a method has been suggested in which during assembly of the rollerball pen, the ink is subjected to a centrifugal defoaming processing under a reduced pressure (For example, refer to Japanese Patent Application Publication (Laid Open) No. 2004-58615, hereinafter referred to as patent document 2.).

However, this method requires a large apparatus and a long processing time, arising a problem in the production.

In order to improve the above defect of the production method, a method has been considered in which gaseous matter in ink is chemically removed. For example, an attempt to add antioxidant such as ascorbic acid or derivatives thereof, catechin derivatives, and choline or its derivatives) (For example, refer to Japanese Patent Publication No. Tokukouhei 7-113101, hereinafter referred to as patent document 3, Japanese Patent Application Publication (Laid Open) No. Tokukaihei 5-86319, hereinafter referred to as patent document 4, and Japanese Patent Application Publication (Laid Open) No. 2000-71676, hereinafter referred to as patent document 5.) and an attempt to add reducing agent such as sodium sulfite and pyrogallol (For example, refer to Japanese Patent Application Publication (Laid Open) No. 2002-80770, hereinafter referred to as patent document 6.) are disclosed.

However, among the compounds for chemically removing gaseous matter in ink, antioxidant (e.g., catechin derivatives, choline or its derivatives) has an influence on color material and causes discoloration, with respect to a system using dye. Furthermore, such antioxidant also has an adverse influence on dispersion with respect to a system using pigment. System using reducing agent also has a problem in stability with lapse of time.

Patent documents 3 and 5 disclose an attempt to add ascorbic acid or derivatives thereof, in order to chemically remove gaseous matter in ink.

The rollerball pen that uses water based ink includes lubricant for the purpose of preventing a ball and a tip seating surface from wearing and the purpose of providing a smooth writing feeling.

Phosphate-ester based surfactant (For example, refer to Japanese Patent Publication No. Tokukouhei 1-13508, hereinafter referred to as patent document 7) and unsaturated fatty acid salts (For example, refer to Japanese Patent Publication No. Tokukouhei 5-54876, hereinafter referred to as patent document 8) are preferable for the above purposes and have been generally used.

Unsaturated fatty acid salts have a structure in which carboxyl group binds with metal and aliphatic group extends into water. This provides a rollerball pen with appropriate lubrication effect and writing feeling.

However, unsaturated fatty acid salts also have a strong surfactant effect due to this structure. Thus, generation of bubbles is intense and bubbles tend to remain in refill even after the centrifugal defoaming process during the assembly of the refill.

In order to solve this defect, addition of antioxidant (bubble suppressant) such as ascorbic acid has also been suggested.

However, since bubbles are easily generated due to the structure of the lubricant, sufficient effect cannot be obtained if the added amount of the antioxidant is small.

Thus, a sufficient defoaming effect requires a large amount of ascorbic acid or derivatives thereof to be added. This has caused an adverse effect such as aggregation of pigment, precipitation of dye, and discoloration.

In contrast, phosphate-ester based surfactant used in the present invention not only has a favorable lubrication effect but also provides reduced bubbling. Therefore, it is suitable for a direct filling type water based gel ink rollerball pen, in which residual bubble arises problems.

Japanese Patent Application Publication (Laid Open) No. 2005-132885, hereinafter referred to as patent document 9, discloses a technique in which ascorbic acid or derivatives thereof is added as a bubble suppressant to a rollerball pen that uses water based ink.

However, the technique disclosed in the patent document 9 is related to an ink having a low viscosity, for improving writing performance of a rollerball pen that uses water based ink. This is different from the ink for a water based gel ink rollerball pen of the present invention which is added with shear thinning viscosity-providing agent.

Furthermore, phosphate-ester based surfactant used in the patent document 9 is structured so that hydrophobic group is one of styrenated phenol-type, which has a hard writing feeling and insufficient lubrication effect, in contrast with the present invention.

Furthermore, some ascorbic acid and derivatives thereof have problems as described above. Thus, mere addition of ascorbic acid or its derivatives is insufficient. For example, although L-ascorbic acid and its salts have a favorable bubble removal effect, some of them have a problem in that dispersion failure of pigments or remarkable discoloration may occur with respect to a system using a specific dye.

SUMMARY OF THE INVENTION

It is an objective of the present invention to provide a water based ink composition for a rollerball pen by using specific lubricant and a specific compound for chemically removing gaseous matter in ink, thus suppressing bubbles from being generated and obtaining a practical property and a favorable writing performance.

In view of the above problems, a research by the present inventor found the following result. Specifically, although some ascorbic acid and derivatives thereof such as L-ascorbic acid and its salts have a favorable bubble removal effect, some of them had a problem in which pigment dispersion failure may occur or remarkable discoloration may occur in a system that uses a specific dye.

The inventor also found that only erythorbic acid and derivatives thereof, that are optical isomers of L-ascorbic acid and derivatives thereof, can be favorably used without causing problems such as pigment dispersion failure or remarkable discoloration in a system using a specific dye.

Since the above conventional phosphate-ester based surfactant provides bubbling, this phosphate-ester based surfactant can be added with erythorbic-acid based compound as a main objective of the present invention to use the former and the latter together to minimize bubble generation.

Phosphate-ester based surfactant originally possesses small bubbling property, and thus addition of small amount of erythorbic-acid based compound is enough to provide a sufficient bubble suppression effect. Furthermore, respective effects of the phosphate-ester based surfactant and the erythorbic-acid based compound do not interfere with each other and thus the phosphate-ester based surfactant and the erythrobate-acid based compound are compatible with each other. Therefore, stable pigment dispersion, stable dye solubility, and discoloration resistance can be obtained.

Further research by the present inventor found that, among phosphate-ester based surfactants, a phosphate-ester based surfactant shown by the following general formula 1, of which hydrophobic group includes alkyl group derived from higher alcohol, provides a particularly superior writing performance, thus arrived at the present invention.

The present invention relates to a water based ink composition for a rollerball pen, the ink composition comprising at least colorant, water-soluble organic solvent, water, shear thinning viscosity property-providing agent, lubricant, and bubble suppressant, wherein the ink composition includes specific lubricant and specific bubble suppressant.

According to a first aspect of the present invention, there is provided a water based ink composition for a rollerball pen comprising: at a least colorant, a water-soluble organic solvent, water, a shear thinning viscosity property-providing agent, a lubricant, and a bubble suppressant, wherein the ink composition includes a phosphate-ester based surfactant having a structure of general formula 1 as the lubricant, and an erythorbic acid or a derivative thereof as the bubble suppressant General formula 1

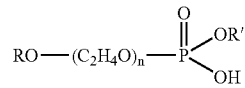

(n represents an integer of 1 or more, R represents an alkyl group having carbon numbers of 12 to 15, and R' represents H or R—$(C_2H_4O)_n$—).

Preferably, the water based ink composition for the rollerball pen includes the erythorbic acid or the derivative thereof by about 0.01 to about 3.0 weight percent.

The water based ink composition for the rollerball pen according to the present invention can provide a remarkable bubble removal effect without causing an adverse effect on other additives. Thus, bubbles are prevented from being generated with time, ink can be smoothly introduced to a writing tip end, a stable writing performance can be maintained, and a smooth and soft writing feeling and a favorable handwriting can be obtained.

By using the above-described specific compound for chemically removing bubbles in ink and phosphate-ester based surfactant having a specific structure in combination, bubble generation can be suppressed. Therefore, a water based ink composition for a rollerball pen can that is practical and can provide a smooth writing feeling and a favorable writing performance, can be obtained.

DESCRIPTION OF THE PREFERRED EMBODIMENTS

The present invention requires the use of the above specific lubricant. Although the reason why the specific phosphate-ester based surfactant provides a favorable result to the invention is not theoretically clarified, the inventor assumes the reason as follows.

That is, lubrication effect of the phosphate-ester based surfactant is obtained due to the phosphate group being adsorbed onto metal surfaces of a socket section of a tip and a ball, and the hydrophobic group extending into the ink, thus generating steric hindrance.

Here, with respect to a phosphate-ester based surfactant having a linear hydrophobic group, the hydrophobic group can extend into the ink in a relatively linear manner due to its structure.

Thus, a cushion effect by hydrophobic groups extending between the tip and the ball can provide a lubrication effect preferable for a rollerball pen (i.e., smooth and soft writing feeling).

In a case where the hydrophobic group has benzene ring (e.g., styrenated phenol, nonyl phenol, octyl phenol and the like), the hydrophobic group do not extend into the ink and the hydrophobic group spread in a planer manner along the tip metal surface due to its structure.

Thus, a sufficient cushion effect cannot be obtained during writing with the rollerball pen and resulting in a stiff and awkward writing feeling.

Furthermore, among higher alcohols, the one having carbon number of 12 to 15 is the most preferable.

In a case where the hydrophobic group is alkyl group derived from short-chained alcohol with a carbon number less than 12, the afore-mentioned cushion effect cannot be obtained efficiently. On the other hand, in a case where the hydrophobic group is alkyl group derived from long-chained alcohol with a carbon number larger than 15, it has a problem concerning stability in ink.

It is noted that the above-mentioned phosphate-ester based surfactant can also be used by neutraling it as needed, with amines or alkaline substance such as alkali metals.

The erythorbic acid and derivatives thereof are optical isomers of L-ascorbic acid generally called as vitamin C, and are the ones shown by the following chemical formula 2 or its derivatives.

The erythorbic acid and derivatives thereof have an antioxidant effect in a similar manner as the L-ascorbic acid and derivatives thereof. The erythorbic acid and derivatives thereof thus show a favorable oxygen absorption capability when added to ink composition. Therefore, it is assumed that this oxygen absorption capability suppresses gaseous matter in the ink, which includes oxygen, from coagulating into bubbles.

The reason why erythorbic acid and derivatives thereof that are optical isomers of L-ascorbic acid and derivatives thereof have such a special effect is not completely clarified. However, it is assumed that in contrast with L-ascorbic acid and derivatives thereof, erythorbic acid and derivatives thereof do not possess effect of vitamin C, and thus a tendency of causing yellowing of aqueous solution is reduced prevent ink discoloration.

Since erythorbic acid and derivatives thereof are optical isomers, it is assumed that an oxidation prevention effect can be obtained without causing influence on dye in the ink and thus discoloration of pigment does not occur.

As for the erythorbic acid and derivatives thereof, erythorbic acid, salts such as sodium erythorbate, magnesium phosphate derivative, and various alkyl group derivatives can be mentioned.

Among them, erythorbic acid and its salts are particularly preferably used.

The erythorbic acid and derivatives thereof can be added to the ink composition from about 0.01 to about 3.0 percent by weight, preferably from about 0.05 to about 2.0 percent by weight, and more preferably from about 0.1 to about 1.0 percent by weight.

In a case where erythorbic acid and it derivatives are added for lower than 0.01 percent by weight, obtainment of a desired bubble suppression effect tends to become difficult. In a case where an erythorbic acid or a derivative thereof is added for 3.0 percent by weight or less, a required effect can be obtained sufficiently. Thus, further addition of the erythorbic acid or the derivative thereof is not required. Rather, excess addition of the erythorbic acid or the derivative thereof raise tendency to inhibit ink stability and thus it is not preferable.

With respect to a colorant for the water based ink composition for the rollerball pen according to the present invention, dye and pigment that can be dissolved or dispersed in aqueous solvent can be used. In particular, the followings can be mentioned for example.

As for the dye, direct dye (e.g., direct black 19, direct black 154, direct yellow 44, direct blue 3, direct blue 71, direct blue 86, direct orange 6 and the like), acid dye (e.g., acid orange 56, acid yellow 3, acid yellow 23, acid red 18, acid red 51, acid red 52, acid red 73, acid red 87, acid red 92, acid red 94, acid blue 9, acid blue 62, acid blue 90, acid blue 103, acid black 2 and the like), and basic dye (e.g., rhodamine, Methyl violet, Victoria Blue FB and the like) can be mentioned.

As for the pigment, inorganic pigment (e.g., carbon black, ultramarine blue, titanium oxide and the like) and organic pigment (e.g., copper phthalocyanine blue, benzidine yellow, azo-based pigment and the like) can be used with appropriate dispersion.

Alternatively, a water dispersed pigment product which is minutely and stably dispersed in water medium by using surfactant or resin can also be used.

As for the pigment, Sandye Super Series manufactured by Sanyo Color Works, LTD., Fuji SP Color Series manufactured by Fuji Pigment Co., Ltd., TC Color Series manufactured by Dainichiseika Color & Chemicals Mfg. Co., Ltd., and Titicaca Color Series manufactured by Mikuni Color Ltd., can be mentioned for example.

As for the resin for dispersing the pigment, for example, polyamide resin, polyurethane resin, polyester resin, epoxy resin, melamine resin, phenol resin, silicone resin, polyvinyl alcohol, polyvinylpyrrolidone, polyvinyl acetate, polyvinyl chloride, polyvinylidene chloride, polystyrene, acrylic acid resin, maleic acid resin, gum Arabic, cellulose, dextran, casein and the like, derivatives thereof, and copolymer of the above-described resins can be mentioned.

The pigment also may preferably use polar carbon, acidic carbon, graft carbon, or easily-dispersible processed pigment in which pigment is surface-processed by dispersive resin.

As for fluorescent pigment, a fluorescent pigment of synthetic resin fine particle, in which various kinds of fluorescent dyes are included as solid solution in a resin matrix, including, for example, LUMICOL NKW series manufactured by Nihon Keiko Kagaku Company, SW Series, SP Series, SG Series, and SF Series manufactured by SINLOIHI CO., LTD, and Victoria Color Series manufactured by Mikuni Color Ltd., can be mentioned.

Chemical formula 2

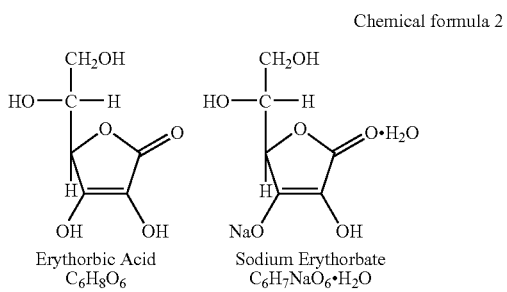

Erythorbic Acid
$C_6H_8O_6$

Sodium Erythorbate
$C_6H_7NaO_6 \cdot H_2O$

Further, white pigment (e.g., titanium dioxide and the like), metal powder pigment (e.g., aluminum and the like), inorganic pigment selected from natural mica, synthetic mica, alumina, and glass chip, pearl pigment obtained by coating the surface of these core substances with metal oxide such as titanium dioxide, and cholesteric liquid crystal-type photoluminescent pigment can be used for example.

Furthermore, microcapsule pigment including reversible heat discoloration-type composition, and heat discoloration-type pigment such as microcapsule pigment including dye or pigment in combination with the reversible heat discoloration-type composition, can also be used.

The pigment may be one type or a mixture of two or more types, and is used in a range of about 1 to about 40 percent by weight with respect to the ink composition and more preferably in a range of about 2 to about 25 percent by weight with respect to the ink composition.

A water based ink composition for a rollerball pen according to the present invention may be added various kinds of selected water-soluble organic solvents as required. As for the water-soluble organic solvent, conventionally-used solvent compatible with water, including for example, ethanol, propanol, butanol, glycerine, sorbitol, triethanolamine, diethanolamine, monoethanolamine, ethylene glycol, diethylene glycol, thiodiethylene glycol, hexylene glycol, 1,3-butanediol, neoprene glycol, polyethylene glycol, propylene glycol, butylene glycol, ethylene glycol monomethyl ether, ethylene glycol monoethyl ether, diethylene glycol monomethyl ether, diethylene glycol monoethyl ether, ethylene glycol monomethyl ether acetate, propylene glycol monomethyl ether, propylene glycol monoethyl ether, 2-pyrrolidone, N-methyl-2-pyrrolidone and the like can be used.

It is noted that the water-soluble organic solvent may be used singly or in a combination of two or more types. The water-soluble organic solvent may be used in a range from about 2 to about 60 percent by weight with respect to the ink composition and preferably in a range from about 5 to about 35 percent by weight with respect to the ink composition.

The water based ink composition for the rollerball pen according to the present invention is added with pseudo plasticity-providing agent.

Effective pseudo plasticity-providing agent is a material that can be dissolved in water or is dispersible in water. Pseudo plasticity-providing agent may be, for example, xanthan gum, wellan gum, succinoglycan which is a heteropolysaccharide modified with organic acid, having monosaccharide component of glucose and galactose (average molecular weight of about one million to about eight million), guar gum, locust bean gum compounds, hydroxyethyl cellulose, alginate alkyl esters, polymer with molecular weight of 100,000 to 150,000 including alkyl ester of methacrylic acid as a major component, polysaccharide thickener having a gelation ability extracted from seaweed (e.g., glucomannan, agar, carrageenin and the like), benzylidene sorbitol and benzylidene xylitol ant its derivatives, cross-linking acrylic acid polymer, inorganic fine particles (e.g., silica, bentonite, laponite and the like), nonion-base surfactant having a HLB value of 8 to 12 (e.g., polyglycerol fatty acid ester, polyoxy ethylene sorbitan fatty acid ester, polyethylene glycol fatty acid ester, polyoxyethylene castor oil, polyoxymethylene lanolin•lanolin alcohol•bees wax derivatives, polyoxyethylene alkyl ether•polyoxypropylene alkyl ether, polyoxyethylene alkyl phenyl ether, fatty acid amide and the like), and salts of dialkyl or dialkenyl sulfosuccinic acid. These may be used singly or in combination.

The pseudo plasticity-providing agent may be used in a range of about 0.1 to about 20.0 percent by weight with respect to the ink composition.

Optionally, pH adjuster, antiseptic agent, or fungicide may also be added.

As for the pH adjuster, inorganic salts (e.g., ammonia, sodium carbonate, sodium phosphate, sodium hydroxide, sodium acetate and the like), organic basic compound (e.g., water-soluble amine compounds and the like such as triethanolamine, diethanolamine and the like), lactic acid, citric acid and the like can be mentioned.

As for the antiseptic agent or the fungicide, for example, phenol, sodium salt of 1,2-benzisothiazoline-3-one, sodium benzoate, sodium dehydroacetate, potassium sorbate, propyl parahydroxybenzoate, 2,3,5,6-tetrachloro-4-(methylsulfonyl) pyridine and the like can be mentioned.

Furthermore, fluorine-based surfactant for improving solvent permeability, nonion, anion, cation-based surfactant, and defoaming agent (e.g., dimethyl polysiloxane) can also be added.

In addition, water-soluble resin such as alkyd resin, acrylic resin, styrene maleate copolymer, cellulose derivative, polyvinylpyrrolidine, polyvinyl alcohol, dextrin and the like may also be added singly or in combination of two or more, and wetting agent such as urea, nonion-type surfactant, sorbit, mannite, sucrose, glucose, reduced starch hydrolysate, sodium pyrophosphate and the like, can also be added, to an extent that drought resistance is not interfered.

Optionally, anti-rust agent can also be added.

As for the anti-rust agent, for example, benzotriazole compounds, tolyl triazole, dicyclohexyl ammonium nitrite, diisopropyl ammonium nitrite, sodium thiosulfate, ethylene diaminetetraacetic acid, saponin, dialkylthiourea and the like can be mentioned.

Another objective of the present invention is a lubricant represented by the general formula 1.

General formula 1

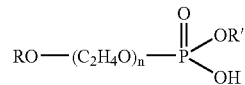

(n represents an integer of 1 or more, R represents an alkyl group having carbon numbers of 12 to 15, and R' represents H or R—$(C_2H_4O)_n$—).

Conventionally, lubricants such as unsaturated fatty acid and its salts, polyalkylene glycol fatty acid ester, ethylene oxide added-type cation activator, thiocarbamate, dimethyldithiocarbamate and the like have been suggested as being appropriate for the water based ink composition for the rollerball pen. When compared with these, the phosphate-ester based surfactant shown by the general formula 1 not only has a superior lubrication effect but also possesses low degree of bubble generating property. Further, the phosphate-ester based surfactant does not have an adverse influence on the erythorbic acid or the derivative thereof that is used in the present invention. Thus, the phosphate-ester based surfactant shown by the general formula 1 is preferably used for the water based ink composition for the rollerball pen according to the present invention which uses the erythorbic acid or the derivative thereof.

Among the phosphate-ester surfactants, the one of which the hydrophobic group includes an alkyl group derived from a higher alcohol having a carbon number of 12 to 15 is particularly preferable since it can achieve a smooth and superior writing feeling.

Hereinafter, specific product names will be mentioned. However, the present invention is not limited to them.

As for the ones in which alkyl group derived from lauryl alcohol is used as hydrophobic group, Plysurf (A208B, A210B, A213B, A219B) and the like manufactured by Dai-ichi Kogyo Seiyaku Co., Ltd. can be mentioned. As for the ones in which alkyl group derived from tridecyl alcohol is used as hydrophobic group, Plysurf (A212C, A215C) and the like manufactured by Dai-ichi Kogyo Seiyaku Co., Ltd. can be mentioned.

As for the ones in which alkyl group derived from synthetic higher alcohol having a carbon number of 12 to 15 is used as hydrophobic group, Plysurf (A208S, A208N) and the like manufactured by Dai-ichi Kogyo Seiyaku Co., Ltd. can be mentioned.

The water based ink composition for the rollerball pen according to the present invention is filled into a direct liquid type rollerball pen (so-called water based gel ink rollerball pen), which is structured so that a rollerball pen tip is provided to a writing head end portion, and a grease-like ink backflow prevention material (liquid plug) for preventing back flow of the ink at the other end, the liquid plug following the ink in accordance with ink consumption, is filled.

The structure and shape of the water based gel ink rollerball pen itself are not particularly limited and the conventionally used general ones can be applied.

The rollerball pen tip will be described in further details. Specifically, a tip which is structured so that a ball is held by a ball holding section formed by cutting metal material by a drill or the like, a tip which is structured so that a ball is held by a ball holding section provided by deforming a portion in the vicinity of a head end of a metal pipe by pressing the portion from the outer face to the inner side, a tip which is provided by cutting a metal pipe or a metal material, the tip being structured so that a ball held by the tip is forwardly biased to the tip by a spring body, or the like can be used.

As for the ball, for example, sintered hard alloy, stainless steel, ruby, silicon carbide, ceramic, and the like can be used.

As for an ink storage tube for storing the water based ink composition, for example, a formed body made of thermoplastic resin (e.g., polyethylene, polypropylene, polyethylene terephthalate and the like) are preferably used with respect to low evaporation property and productivity. Further, in a case where the ink storage tube is transparent, colored transparent, half transparent formed body or the like, color of the ink, remaining amount of the ink therein and the like can be checked.

The ink storage tube may be directly connected with the tip, or the ink storage tube may be connected with the tip through a connecting member.

The ink storage tube may be provided in a form of a refill by storing the refill in an axial cylinder of a writing instrument, or the axial cylinder itself attached with the tip at the head end may be used as the ink storage body to directly fill the ink into the axial cylinder.

To the rear end of the water based ink composition for the rollerball pen according to the invention, the water based ink being stored in the ink storage tube, an ink backflow prevention material is filled.

As for the ink backflow prevention material, either one of liquid-type or grease-type one can be used. As for the liquid-type ink backflow prevention material, nonvolatile medium (e.g., polybutene, silicone oil and the like) can be mentioned.

Further, the medium may also be added as desired, with silica, aluminium silicate, oil-absorbing resin and the like to make the medium into the grease-type one.

A solid ink backflow prevention material may also be used in combination.

The water based ink composition for the rollerball pen according to the present invention is prepared by adding to an aqueous medium dye or pigment (pigment dispersion element), water-soluble organic solvent, shear thinning viscosity-providing agent, lubricant, bubble suppressant, and various kinds of additives as required, agitating the mixture within heating as desired, thus to dissolve and disperse the compounds. The water based ink composition for the rollerball pen can also be used by filling it into various kind of rollerball pens described above.

Hereinafter, examples and comparison examples will be described specifically. It is noted that values of the compositions are represented by weight percent.

EXAMPLE 1

Aqueous solution including 15% of direct black 154: 40.0 (manufactured by Orient Chemical Industries., Ltd., product name: "Water black 187LM, black dye aqueous solution)

Ethylene glycol (water-soluble organic solvent): 15.0

Diethylene glycol (water-soluble organic solvent): 5.0

Succinoglycan (shear thinning viscosity-providing agent): 0.3 (heteropolysaccharide modified with organic acid, having monosaccharide compound of glucose and galactose)

1,2-benzoisothiazoline-3-one (fungicide): 0.2 (manufactured by Zeneca, Co., Ltd., product name: Proxel XL-2)

Triethanolamine (pH adjuster): 0.5

Sodium erythorbate (bubble suppressant): 1.0 (manufactured by FUSO CHEMICAL CO., LTD, product name: Elbit N)

Phosphate-ester based surfactant: 0.5 (manufactured by Dai-ichi Kogyo Seiyaku Co., Ltd., product name: Plysurf A213B (lubricant represented by the general formula 1 in which alkyl group derived from lauryl alcohol (C=12) is a hydrophobic group))

Ion-exchange water: 37.5

Total: 100.0

Among the above components, ion-exchange water was mixed with succinoglycan. The mixture was heated to 60 degrees Celsius and was agitated by a disper agitator for three hours. Thereafter, the remaining components were added to the mixture and the mixture was agitated by the disper agitator for one hour. The mixture was subjected to a centrifugal defoaming with 530G for five minutes, and black gel-like water based ink composition for rollerball pen was obtained.

EXAMPLE 2

Aqueous solution of 15% of direct black 19: 40.0 (manufactured by Orient Chemical Industries., Ltd., product name: "Water black 191L, black dye aqueous solution)

Ethylene glycol (same as above): 15.0

Diethylene glycol (same as above): 5.0

Succinoglycan (same as above): 0.3

1,2-benzoisothiazoline-3-one (same as above): 0.2

Triethanolamine (same as above): 1.0

Sodium erythorbate (same as above): 0.1

Phosphate-ester based surfactant: 1.5 (manufactured by Dai-ichi Kogyo Seiyaku Co., Ltd., product name: Plysurf A213B (lubricant represented by the general formula 1 in which alkyl group derived from lauryl alcohol (C=12) is a hydrophobic group))
Ion-exchange water: 36.9
Total: 100.0

Among the above components, ion-exchange water was mixed with succinoglycan. The mixture was heated to 60 degrees Celsius and was agitated by a disper agitator for three hours. Thereafter, the remaining components were added to the mixture and the mixture was agitated by the disper agitator for one hour. The mixture was subjected to a centrifugal defoaming with 530G for five minutes, and black gel-like water based ink composition for rollerball pen was obtained.

EXAMPLE 3

Blue dye: 3.0 (manufactured by Orient Chemical Industries., Ltd., product name: Water Blue 105S, C. I. Acid Blue 90)
Glycerine (water-soluble organic solvent): 15.0
Polyethylene glycol #200 (water-soluble organic solvent): 5.0
Xanthan gum (shear thinning viscosity-providing agent): 0.4
1,2-benzoisothiazoline-3-one (same as above): 0.2
Triethanolamine (same as above): 0.5
Sodium erythorbate (same as above): 0.5
Phosphate-ester based surfactant: 0.5 (manufactured by Dai-ichi Kogyo Seiyaku Co., Ltd., product name: Plysurf A210B (lubricant represented by the general formula 1 in which alkyl group derived from lauryl alcohol (C=12) is a hydrophobic group))
Ion-exchange water: 74.9
Total: 100.0

Among the above components, ion-exchange water was mixed with xanthan gum. The mixture was heated to 60 degrees Celsius and was agitated by a disper agitator for three hours. Thereafter, the remaining components were added to the mixture and the mixture was agitated by the disper agitator for one hour. The mixture was subjected to a centrifugal defoaming with 530G for five minutes, and blue gel-like water based ink composition for rollerball pen was obtained.

EXAMPLE 4

Red dye: 3.0 (manufactured by Orient Chemical Industries., Ltd., product name: Water Red #1, C. I. Acid Red 18)
Ethylene glycol (same as above): 15.0
Urea (moisturizer): 5.0
Xanthan gum (same as above): 0.15
Succinoglycan (same as above): 0.15
Cross-linking acrylic acid copolymer (shear thinning viscosity-providing agent): 0.15 (manufactured by Wako Pure Chemical Industries, Ltd., product name: Hiviswako 104)
1,2-benzoisothiazoline-3-one (same as above): 0.2
Triethanolamine (same as above): 0.5
Sodium erythorbate (same as above): 0.5
Phosphate-ester based surfactant: 1.0 (manufactured by Dai-ichi Kogyo Seiyaku Co., Ltd., product name: Plysurf A215C (lubricant represented by the general formula 1 in which alkyl group derived from tridecyl alcohol (C=13) is a hydrophobic group))
Ion-exchange water: 74.35
Total: 100.0

Among the above components, ion-exchange water was mixed with xanthan gum and succinoglycan. The mixture was heated to 60 degrees Celsius and was agitated by a disper agitator for three hours. Thereafter, the remaining components were added to the mixture and the mixture was agitated by the disper agitator for one hour. The mixture was subjected to a centrifugal defoaming with 530G for five minutes, and red gel-like water based ink composition for rollerball pen was obtained.

EXAMPLE 5

Green pigment water dispersion: 40.0 (manufactured by Fuji Pigment Co., Ltd., product name: SP Green 7246, 16% aqueous dispersion of C. I. Pigment Green 7, acrylic resin dispersing agent)
Glycerine (same as above): 20.0
Cross-linking acrylic acid copolymer (same as above): 0.4 (manufactured by Wako Pure Chemical Industries, Ltd., product name: Hiviswako 103)
1,2-benzoisothiazoline-3-one (same as above): 0.2
Triethanolamine (same as above): 0.7
Sodium erythorbate (same as above): 0.5
Phosphate-ester based surfactant: 1.5 (manufactured by Dai-ichi Kogyo Seiyaku Co., Ltd., product name: Plysurf A215C (lubricant represented by the general formula 1 in which alkyl group derived from tridecyl alcohol (C=13) is a hydrophobic group))
Ion-exchange water: 36.7
Total: 100.0

Among the above components, components other than the cross-linking acrylic acid copolymer were mixed. The mixture was heated to 60 degrees Celsius and was agitated by a disper agitator for three hours. Thereafter, the cross-linking acrylic acid copolymer was added to the mixture and the mixture was agitated by the disper agitator for one hour. The mixture was subjected to a centrifugal defoaming with 530G for five minutes, and green gel-like water based ink composition for rollerball pen was obtained.

EXAMPLE 6

Fluorescent pink pigment water dispersion: 40.0 (manufactured by Nihon Keiko Kagaku Company, product name: LUMICOL NKW-2117 pigment of about 45%)
Glycerine (same as above): 20.0
Urea (same as above): 7.5
Triethanolamine (same as above): 1.8
Succinoglycan (same as above): 0.25
1,2-benzoisothiazoline-3-one (same as above): 0.2
Sodium erythorbate (same as above): 0.3
Phosphate-ester based surfactant: 1.0 (manufactured by Dai-ichi Kogyo Seiyaku Co., Ltd., product name: Plysurf A208N (lubricant represented by the general formula 1 in which alkyl group derived from synthetic alcohol having carbon number of 12-15, is a hydrophobic group))
Ion-exchange water: 28.95
Total: 100.0

Among the above components, ion-exchange water was mixed with succinoglycan. The mixture was heated to 60 degrees Celsius and was agitated by a disper agitator for three hours. Thereafter, the remaining components were added to the mixture and the mixture was agitated by the disper agitator for one hour. The mixture was subjected to a centrifugal defoaming with 530G for five minutes, and pink gel-like water based ink composition for rollerball pen was obtained.

COMPARISON EXAMPLE 1

Black gel-like water based ink composition for a rollerball pen was obtained in the same manner as that of example 1, except that L-ascorbic acid (manufactured by Wako Pure Chemical Industries, Ltd., product name: reagent L-ascorbic acid) was used in place of sodium erythorbate.

COMPARISON EXAMPLE 2

Black gel-like water based ink composition for a rollerball pen was obtained in the same manner as that of example 2, except that potassium oleate was used in place of anti-rust lubricant.

COMPARISON EXAMPLE 3

Blue gel-like water based ink composition for a rollerball pen was obtained in the same manner as that of example 3, except that phosphate-ester based surfactant (manufactured by Dai-ichi Kogyo Seiyaku Co., Ltd., product name: Plysurf AL) in which styrene phenol is a hydrophobic group was used in place of anti-rust lubricant, and ion-exchange water was used in place of sodium erythorbate.

COMPARISON EXAMPLE 4

Red gel-like water based ink composition for a rollerball pen was obtained in the same manner as that of example 4, except that sodium L-ascorbate (manufactured by FUSO CHEMICAL CO., LTD, product name: sodium L-ascorbate) was used in place of sodium erythorbate.

COMPARISON EXAMPLE 5

Green gel-like water based ink composition for a rollerball pen was obtained in the same manner as that of example 5, except that phosphate-ester based surfactant (manufactured by Dai-ichi Kogyo Seiyaku Co., Ltd., product name: Plysurf AL) in which styrene phenol is a hydrophobic group was used in place of anti-rust lubricant, and L-ascorbic acid (manufactured by Wako Pure Chemical Industries, Ltd., product name: reagent L-ascorbic acid) was used in place of sodium erythorbate.

COMPARISON EXAMPLE 6

Fluorescent pink gel-like water based ink composition for a rollerball pen was obtained in the same manner as that of example 6, except that ion-exchange water was used in place of sodium erythorbate.

Water based ink compositions for rollerball pens obtained by examples 1 to 5 and comparison examples 1 to 6 were each filled into a rollerball pen refill in which a stainless steel tip that holds a ball having a diameter of 0.5 m is fit into one end of polypropylene ink storage tube via a resin holder. Then, a grease-like ink backflow prevention material was provided so as to contact with the ink composition at the opposite side of the rollerball pen tip. The refills were subjected to a centrifugal processing with 530G for three minutes. The rollerball pen refills were assembled to axial cylinders of writing instruments, thereby providing the form of rollerball pens.

The ink composition obtained in example 6 and the fluorescent ink composition obtained in comparison example 6 were also provided in the form of rollerball pens in the same manner as the above method, except that balls having diameter of 0.7 mm were held in the stainless steel tips.

Evaluation with respect to writing feeling by handwriting (sensory test), existence of bubbles in an ink storage tube, occurrence of discoloration by visual inspection, and observation of condition of ink in the ink storage tube by an optical microscope (magnification by 200), were conducted respectively for rollerball pens immediately after being manufactured and rollerball pens after being left at 50 degrees Celsius for two weeks with the tips facing downward (after aging). The results are shown in Table 1 below.

TABLE 1

| | Initial | | | | After 50 degrees Celsius/2 weeks aging | | | |
| --- | --- | --- | --- | --- | --- | --- | --- | --- |
| | Writing feeling | Bubble generation | Discoloration | Ink condition | Writing feeling | Bubble generation | Discoloration | Ink condition |
| Example 1 | A | 0% | A | A | A | 0% | A | A |
| Example 2 | A | 0% | A | A | A | 0% | A | A |
| Example 3 | A | 0% | A | A | A | 0% | A | A |
| Example 4 | A | 0% | A | A | A | 0% | A | A |
| Example 5 | A | 0% | A | A | A | 0% | A | A |
| Example 6 | A | 0% | A | A | A | 0% | A | A |
| Comparison example 1 | A | 0% | A | A | C(*1) | 0% | A | B(*3) |
| Comparison example 2 | A | 0% | A | A | A | 40% | A | A |
| Comparison example 3 | B | 0% | A | A | B | 90% | A | A |
| Comparison example 4 | A | 0% | A | A | A | 0% | Turned black | A |
| Comparison example 5 | B | 0% | A | A | C(*2) | 0% | A | B(*4) |
| Comparison example 6 | A | 0% | A | A | A | 90% | A | A |

(*1) unable to write
(*2) patchy handwriting
(*3) precipitation of dye
(*4) aggregation of pigment It is noted that the results in the above table were judged based on the following criteria.

Writing Feeling (n=20)
A: favorable, smooth and soft writing feeling
B: slightly heavy writing feeling that is less preferable
C: arises problem in writing, such as being unable to write, patchy handwriting is obtained, writing feeling is stiff, and the like Bubble Generation (n=20)
Bubble generation in a rollerball pen is visually checked and a bubble generation rate was determined based on the number of rollerball pens causing bubble generation.

Occurrence of Discoloration (n=20)
A: No discoloration was observed in the appearance of the rollerball pen by visual check.
B: Discoloration was observed in the appearance of the rollerball pen when compared with the initial status, and handwriting also showed discoloration.

Ink Condition (n=10)
A: No dye precipitation, no pigment aggregation, or other abnormalities were not found.
B: Dye precipitation, pigment aggregation, or other abnormalities were found.

The rollerball pens that use water based ink composition according to examples 1 to 6 showed superior results with regards to all evaluation items.

Although comparison examples 1, 2, 4, and 6 showed good results in the initial status, comparison examples 1, 2, 4, and 6 showed problems after time.

Specifically, in comparison example 1, bubble suppressant showed poor compatibility with other components to cause precipitation of dye, resulting in writing failure.

In the case of comparison example 2, the rust-proof lubricant inhibited the bubble suppression effect of sodium erythorbate, thus bubbles were generated.

In the case of comparison example 4, the dye turned black due to influence by L-ascorbic acid.

In the case of comparison example 6, since bubble suppressant was not included, generation of bubbles was significant.

In the cases of comparison example 3 and comparison example 5, the writing feeling was poor from the initial status. Generation of bubbles was significant in comparison example 3. Since comparison example 5 used a combination of bubble suppressant and rust-proof lubricant that is different from that of the present invention, pigment aggregated, writing feeling was poor, and handwriting became patchy.

The composition according to the present invention can be applied to water based ink composition for rollerball pen that is practical, the ink composition being able to obtain a superior writing performance, and to a rollerball pen filled with the water based ink composition.

The entire disclosure of Japanese Patent Application No. 2006-058043 filed on Mar. 3, 2006 including specification, claims and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A water based ink composition for a rollerball pen comprising:
    at least a colorant, a water-soluble organic solvent, water, a shear thinning viscosity property-providing agent, a lubricant, and a bubble suppressant,
    wherein the ink composition includes a phosphate-ester based surfactant having a structure of general formula 1 as the lubricant, and an erythorbic acid or a derivative thereof as the bubble suppressant;

General formula 1

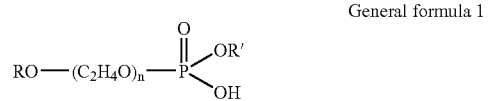

(where n represents an integer of 1 or more, R represents an alkyl group having carbon numbers of 12 to 15, and R' represents H or R—$(C_2H_4O)_n$—.

2. The water based ink composition for the rollerball pen as claimed in claim 1, wherein the water based ink composition includes the erythorbic acid or the derivative thereof by about 0.01 to about 3.0 weight percent.

* * * * *